Figure 1:
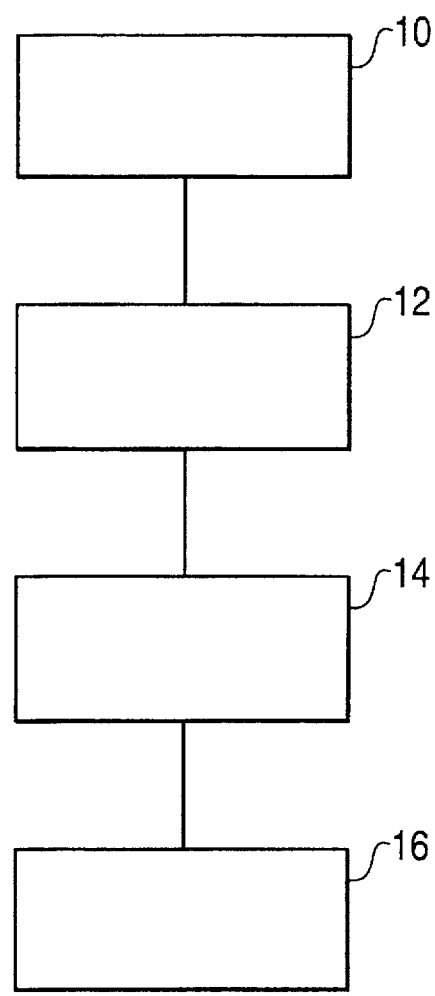

United States Patent [19]

Berger

[11] Patent Number: 5,800,604

[45] Date of Patent: Sep. 1, 1998

[54] WAX

[75] Inventor: Steffen Berger, Düsseldorf, Germany

[73] Assignee: Arplas Gesellschaft Fur Plasmatechnologie mbH, Weissandt-Golzau, Germany

[21] Appl. No.: 722,079

[22] PCT Filed: Mar. 8, 1995

[86] PCT No.: PCT/EP95/00860

§ 371 Date: Jan. 27, 1997

§ 102(e) Date: Jan. 27, 1997

[87] PCT Pub. No.: WO95/29213

PCT Pub. Date: Nov. 2, 1995

[30] Foreign Application Priority Data

Apr. 21, 1994 [DE] Germany .......................... 44 16 070.4

[51] Int. Cl.⁶ .......................... C08L 91/06; C08L 91/08

[52] U.S. Cl. .................. 106/270; 204/167; 585/9; 585/923

[58] Field of Search .................. 106/270; 204/167; 585/9, 923

[56] References Cited

FOREIGN PATENT DOCUMENTS 0177364  4/1986  European Pat. Off. ....... D06M 15/00

*Primary Examiner*—David Brunsman
*Attorney, Agent, or Firm*—Finnegan, Henderson, Farabow, Garrett & Dunner, L.L.P.

[57] ABSTRACT

The invention relates to a novel wax and also to a process for preparing the wax which can be chemically modified in a simple, flexibly adaptable, inexpensive and environmentally friendly way. For this purpose, it is provided for the untreated waxes to be subjected to a low-temperature plasma treatment by means of which the waxes can be chemically modified in accordance with the application.

15 Claims, 1 Drawing Sheet

WAX

Waxes are known. For the purposes of the invention, waxes are organic materials which at about 20° C. are generally kneadable, solid to brittle-hard, translucent, opaque and/or polishable and which are converted above 40° C. into a relatively low-viscosity melt. Waxes can, for example [lacuna] animal waxes, for example beeswax, plant waxes which consist predominantly of esters of higher fatty acids, for example palmitic acid, and higher alcohols, for example cetyl alcohol, myricyl alcohol, naturally occurring mineral waxes, paraffin waxes (solid alkanes), polyolefin waxes, montan waxes (esters of montanic acid), further synthetic waxes, for example esters derived, for example, from polyethylene, chlorinated hydrocarbons and others and other natural waxes, for example esters of higher monohydric alkanols and higher monobasic carboxylic acids.

It is known that these waxes can be used, for example, for coating and impregnating various materials, for example paper, wood, leather, etc., and for producing primarily aqueous, environmentally-friendly surface coating systems, for electrical insulation, etc. In a number of these applications, the waxes are processed in the form of dispersions, emulsions and solutions, so that the dispersibility, emulsifiability and solubility of the waxes is a very important processing parameter.

Furthermore, waxes are used as auxiliaries in plastics processing or as starting materials for producing surfactants, plasticizers, soaps and detergents. Here, it is known that only special waxes can be used for certain application areas among those mentioned by way of example, these special waxes having to be prepared either by chemical modification of the waxes mentioned or by a complicated and therefore expensive special synthesis. A disadvantage here is that in the known processes for the chemical modification or special syntheses, different processes have to be employed for the modification or synthesis depending on the type of wax used and on the desired field of application. Thus, a separate plant technology is necessary in each case for producing particular waxes directed at a concrete application, and this makes the special waxes obtained considerably more expensive.

A further significant disadvantage of a number of the known modification processes is that often toxic and/or aggressive starting materials, for example $SO_2$ and $Cl_2$ in sulfochlorination, $HNO_3$ in nitration, are required and/or toxic and aggressive reaction products, for example HCl in sulfochlorination, are formed. Thus, in addition to the complicated production process, a comprehensive protective mechanism for protecting the environment from the toxic and/or aggressive materials is necessary.

It is therefore an object of the invention to provide a wax which is simple and inexpensive to prepare and whose properties can be chemically modified in a simple, flexibly adaptable, inexpensive and environmentally friendly way.

According to the invention, this object is achieved by subjecting known untreated waxes to a low-temperature plasma treatment in a frequency range from preferably 10 kHz to 10 GHz. For the purposes of the present invention, low-temperature plasma treatment means that the material to be treated is itself not heated above a certain temperature range, for example from 40° to 60° C. It has surprisingly been found that the waxes thus treated have an increased wettability, an improved dispersibility, emulsifiability and solubility and also an improved reactivity toward a wide variety of materials. This enables, on the one hand, the waxes of the invention to be used in the known fields of application without each individual application necessitating a specific modification to give special waxes or special syntheses directed only at this application. One and the same treatment of the waxes enables, merely by varying the process parameters during the low-temperature plasma treatment, the waxes to be optimally matched to different fields of application, i.e. matched to the chemical properties required of the waxes for these fields of application. In addition, the surprisingly simple possible chemical modification of the waxes opens up completely new fields of application, for example as dispersants for pigment concentrates, hot melts for coating, melt adhesives or compatibilizers for compounds.

Particular preference is given to a wax into which are incorporated by means of the low-temperature plasma treatment, for example by selection of of a composition of the process gas during the low-temperature plasma treatment, where process gas is here an inert gas used, an inert gas mixture used, a reaction gas, a reaction gas mixture, to the untreated wax, for example the type of the wax, a particle size, a particle surface and the planned use of the treated product, into the waxes for the respective application the required polar groups, for example carbonyl, hydroxyl, carboxyl and amino groups.

A particularly preferred wax is obtained when the low-temperature plasma treatment of the untreated waxes is carried out using changing frequencies, preferably using combinations of variously high, changing frequencies. Here, simultaneous treatment with a reaction gas plasma and/or a plasma of a reaction gas mixture enables very advantageous tailoring to a different chemical modification of the untreated waxes with matching of the frequencies, the inert gas, the reaction gas, the starting material and the desired use of the treated waxes being able to be carried out optimally.

It has been found that the process found enables the proportion of required polar groups to be decisively increased and combined, thus giving a substantial, completely surprising step change in quality when the waxes treated according to the invention are used.

Further advantageous embodiments of the invention can be derived from the other features indicated in the subclaims.

The invention is illustrated below in an example with the aid of the associated drawing which shows a flow diagram of a process procedure for preparing a wax.

The FIGURE is intended to clarify the process with the aid of the diagram. In a first process step 10, the untreated waxes available as starting materials are subjected to pre-processing. The untreated waxes are here, for example, brought into a powder and/or granule form, for example a coarse powder form. As starting material, it is possible to use all known waxes of which some have been mentioned by way of example in the introduction.

In a next process step 12, the prepared starting material is placed in a process chamber. The process chamber can here be, for example, a rotating drum of a plasma furnace known per se for carrying out a low-temperature plasma treatment.

In a next process step 14, the process parameters and process gasses desired for the treatment of the starting material are set. Here, in particular, the specific combinations of the process gasses, i.e. for example a first treatment with an inert gas plasma, preferably with helium and/or argon, and the subsequent treatment with a reaction gas plasma, preferably with oxygen and/or nitrogen, or also the treatment with a plasma which is produced from a mixture of the above-mentioned gasses, are laid down. Further, the high frequencies necessary for generating the plasma in a vacuum and their time sequence are set. Thus, conceivable variants are ones in which a plasma treatment is carried out first using a relatively low frequency, for example 13.56 MHz, and subsequently using a higher frequency, for example 2.45 GHz. In addition, alternating switching on of the frequencies is conceivable. Of course, it is also possible to set other frequencies in any freely selectable order for carrying out the plasma treatment. The untreated wax is placed in motion during the plasma treatment by setting the desired rotation rate of the rotating drum, for example, in the range between 4 and 20 revolutions per minute. Also, the desired process pressure which is, for example, in the range of 0.1 mbar to 2 mbar, and more preferably between 0.3 mbar and 1 mbar is set. During the plasma treatment, the process pressure can be subject to fluctuations as a result of the process. Furthermore, the treatment time for which the starting material is treated is set. This is, for example, 5 to 800 seconds, and preferably between 15 and 600 seconds. Said process parameters or process gasses can be varied among one another in any configuration and are, in particular, matched to the composition of the respective particular starting material, i.e. the untreated wax, and also to the desired use of the end product.

The plasma treatment of the starting material is then carried out in a next process step 16 using the process parameters or process conditions set in step 14. Here, it is likewise conceivable that a change and/or matching of the process parameters can be carried out, for example by means of regulation, during the plasma treatment in step 16.

For the waxes of the invention, any conceivable application requiring the use of a wax in possible. This can be, for example, the preparation of dispersions, emulsions and solutions for coating and/or impregnating any materials. Furthermore, use as hot melt for coating, polymer additive, dispersant, compatibilizer for compounds, melt adhesive, auxiliary in plastics processing, surfactant, release agent, lubricant and also as constituent in the preparation of said applications, the preparation of surface coating dispersion, the preparation of soaps, the preparation of detergents and the preparation of sizes for glass and carbon fibers is possible.

In a concrete example, the rotation drum of a low-temperature plasma unit known per se is charged with, as starting material, a polyethylene wax, for example LE wax 112, in coarse powder form. As process parameter, a process pressure of 0.8 mbar is set at a rotational speed of the rotating drum of eight revolutions per minute. The power of the microwave generator is 250 watt and that of the high-frequency injection is likewise 250 watt. The low-temperature plasma treatment is carried out, in the case of an argon plasma, for 15 seconds at the high frequency and for 15 seconds at the microwave frequency, in the case of an oxygen plasma for 60 seconds at the high frequency and 60 seconds at the microwave frequency and in the case of a nitrogen plasma for 30 seconds at the high frequency and 30 seconds at the microwave frequency. The microwave generator here produces a frequency of 2.45 GHz and the high-frequency injection produces a frequency of 13.56 MHz. After treatment of the starting material is complete, there is obtained a wax from which an aqueous dispersion can be prepared at room temperature, while no aqueous dispersion can be prepared at room temperature using the LE wax 112 used as starting material.

I claim:

1. A wax which has been modified by having polar groups incorporated into a starting wax, the modified wax being prepared by subjecting a starting wax in granulated or powdered form to a low temperature plasma treatment employing a frequency within the range of from 10 kHz to 10 GHz, while maintaining during the treatment a process atmosphere enabling incorporation of polar groups into the wax.

2. The wax according to claim 1, wherein the polar groups are selected from the group consisting of carbonyl, hydroxyl, carboxyl and amino groups.

3. A process for the production of a modified wax, which comprises subjecting a starting wax in granulated or powdered form to a low temperature plasma treatment employing a frequency in the range of from 10 kHz to 10 GHz and in the presence of a process gas which enables the incorporation of polar groups into the wax.

4. The process according to claim 3, wherein in the plasma treatment is carried out within a frequency range of from 13.56 MHz to 2.45 GHz.

5. The process according to claim 3, wherein the plasma treatment is carried out using changing frequencies.

6. The process according to claim 5, wherein the plasma treatment is carried out using combinations of various changing frequencies.

7. The process according to claim 3, wherein the starting wax is selected from the group consisting of paraffin waxes, polyolefin waxes, and montan waxes.

8. The process according to claim 3, wherein the plasma treatment is carried out in the presence of an inert gas.

9. The process according to claim 3, wherein the plasma treatment is carried out in the presence of a reaction gas.

10. The process according to claim 3, wherein the plasma treatment is carried out successively using at least one inert gas plasma and at least one reaction gas plasma or at least one plasma of a reaction gas mixture or in the presence of a mixture of at least one inert gas and at least one reaction gas.

11. The process according to claim 3, wherein the plasma treatment is carried out at a process pressure of from 0.1 mbar to 2 mbar.

12. The process according to claim 3, wherein the duration of the plasma treatment is from 5 s to 800 s.

13. The process according to claim 3, wherein the starting wax is placed in motion during the plasma treatment.

14. The process according to claim 13, wherein the wax is tumbled in a rotating drum during the plasma treatment.

15. The process according to claim 3, wherein the process gas is a gas selected from the group consisting of argon, helium, oxygen and nitrogen.

* * * * *